(12) United States Patent
Cowan et al.

(10) Patent No.: US 7,023,584 B2
(45) Date of Patent: Apr. 4, 2006

(54) COLOR CALIBRATION METHOD AND APPARATUS

(75) Inventors: Philip B Cowan, Vancouver, WA (US); Kevin R Hudson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 09/969,682

(22) Filed: Oct. 2, 2001

(65) Prior Publication Data

US 2003/0063299 A1   Apr. 3, 2003

(51) Int. Cl.
*B41J 1/00*      (2006.01)
*G06F 15/00*   (2006.01)
*G06K 9/00*    (2006.01)

(52) U.S. Cl. .................. 358/1.9; 358/504; 358/502; 382/167

(58) Field of Classification Search ................. 358/1.9, 358/504, 502; 347/105; 382/167; 345/150, 345/251; 101/171
See application file for complete search history.

(56) References Cited

U.S. PATENT DOCUMENTS

| | | | |
|---|---|---|---|
| 5,510,910 A | 4/1996 | Bockman et al. | |
| 5,978,011 A | 11/1999 | Jacob et al. | |
| 6,023,527 A | 2/2000 | Narahara | |
| 6,053,609 A | 4/2000 | Barton et al. | |
| 6,062,137 A | 5/2000 | Guo et al. | |
| 6,225,974 B1 | 5/2001 | Marsden et al. | |
| 2002/0180998 A1 * | 12/2002 | Wu | ............................ 358/1.9 |

* cited by examiner

*Primary Examiner*—Mark Wallerson
*Assistant Examiner*—Charlotte M. Baker

(57) ABSTRACT

A method, includes depositing a first quantity of a first colorant corresponding to a first color value and a second quantity of a second colorant corresponding to a second color value on a region of media, determining a value related to a hue of the region, determining a difference between the value and a predetermined value. In addition, the method includes changing an association between the first color value and a first colorant quantity value, corresponding to the first quantity of the first colorant, according to the difference. An apparatus includes a spectral measurement device configured to generate output corresponding to a spectral content of light reflected from a region on media formed by depositing a first quantity of a first colorant and a second quantity of a second colorant onto the media. In addition, the apparatus includes a memory to store a plurality of color values and a corresponding plurality of first colorant quantity values. Furthermore, the apparatus includes a a processing device coupled to the memory and arranged to receive the output from the spectral measurement device and configured to determine a value related to a hue of the region using the output, configured to determine a difference between the value and a predetermined value, and configured to change an association between the plurality of color values and the plurality of first colorant quantity values according to the difference.

29 Claims, 10 Drawing Sheets

COLOR CALIBRATION METHOD AND APPARATUS

CROSS REFERENCE TO RELATED APPLICATIONS

This patent application includes subject matter related to a co-pending patent application having Ser. No. 09970278, filed on the same day as this patent application, and incorporated by reference in its entirety into this patent application.

INTRODUCTION

Imaging devices, such as inkjet printers, inkjet facsimile machines, electrophotographic printers, electrophotographic facsimile machines, electrophotographic copiers, and the like, form images on media by placing colorant onto media. Electrophotographic imaging devices form images by transferring developed latent electrostatic images formed of a colorant, such as toner particles, onto media and fixing the toner to the media. The latent electrostatic images are typically formed by exposing a photoconductor to a pulsating laser beam that repeatedly sweeps across the photoconductor while the surface of the photoconductor moves perpendicular to the direction of movement of the laser beam. The laser beam is pulsed according to a single bit stream of digital data derived from the data defining the image that is to be formed.

Some electrophotographic imaging devices form color images by successively transferring a developed latent electrostatic image for each color plane (cyan, magenta, yellow, and black color planes) using a single set of hardware (photoconductor, charging device, laser scanner, developing device, etc.) Other electrophotographic imaging devices include separate sets of hardware for each color plane to form and develop the latent electrostatic image and transfer the developed latent electrostatic image to media.

Inkjet imaging devices form images by ejecting drops of a colorant, such as ink, onto the media using printheads for each of the ink colors. There is relative movement between the printheads and media while ejecting ink droplets from orifices included within the printheads. The printheads eject ink according to electrical signals derived from data defining the image that is to be formed. Typically the ink colors used to form color images include cyan, magenta, and yellow ink. By ejecting various combinations of quantities of the different color inks onto the media, a wide range of colors can be reproduced on the media. In addition, many inkjet printers make use of black ink for forming text characters and black regions of images.

The color of a region formed on a surface or displayed on a monitor can be characterized by color space values in any of a variety of color spaces. For example, colors values for the region could be characterized by values expressed in a RGB color space, a CMYK color space, a XYZ color space, a L*a*b* color space, or a L*u*v* color space. Accurately reproducing the color of the region on media using an imaging device involves careful control of the quantity and placement of the colorants used to form the image corresponding to the region.

Consider the color of a region expressed in the L*a*b* color space in an imaging device that makes use of cyan ink, magenta ink, and yellow ink. The color of the region is specified as a L* value, an a* value, and a b* value. The L*a*b* color space expresses color values in a rectangular coordinate system, with the L*, a*, and b* values each corresponding to one dimension of the three dimensions forming the rectangular coordinate system. The L* value characterizes the lightness/darkness aspect of the color of the region along an axis ranging from black to white, with corresponding values ranging from 0 to 100. The a* value characterizes the color of the region along an axis ranging from green to red, with positive values corresponding to red and negative values corresponding to green. The b* value characterizes the color of the region along an axis ranging from blue to yellow, with positive values corresponding to yellow and negative values corresponding to blue. Together, the a* value and the b* value express the hue and chroma of the region. The zero point in the plane defined by the a* values and the b* values corresponds to a neutral gray color having a L* value corresponding to the intersection of the plane with the L* axis.

Placement of combinations of various quantities and colors of ink or toner is done to accurately reproduce the color of the region. The accurate reproduction of colors for imaging devices that form images by ejecting ink or transferring toner onto media typically involves a process of compensation of the non-linearities in the relationship between the quantity of the colorant placed onto the media and the intensity of the color corresponding to the colorant. The intensity of a color specified in a color space defined by cylindrical coordinates corresponds to a chroma value. For many types of inks or toners the change in the chroma value is a non-linear function of the quantity of the ink or toner deposited on the media. To assist in accurate color reproduction, compensation is applied to this non-linear relationship to modify it to more closely follow a linear relationship. The manner in which the compensation for non-linearities is performed can affect the accuracy of color reproduction.

SUMMARY OF THE INVENTION

A method, includes depositing a first quantity of a first colorant corresponding to a first color value and a second quantity of a second colorant corresponding to a second color value on a region of media, determining a value related to a hue of the region, determining a difference between the value and a predetermined value. In addition the method includes changing an association between the first color value and a first colorant quantity value, corresponding to the first quantity of the first colorant, according to the difference.

An apparatus includes a spectral measurement device configured to generate output corresponding to a spectral content of light reflected from a region on media formed by depositing a first quantity of a first colorant and a second quantity of a second colorant onto the media. In addition, the apparatus includes a memory to store a plurality of color values and a corresponding plurality of first colorant quantity values. Furthermore, the apparatus includes a a processing device coupled to the memory and arranged to receive the output from the spectral measurement device and configured to determine a value related to a hue of the region using the output, configured to determine a difference between the value and a predetermined value, and configured to change an association between the plurality of color values and the plurality of first colorant quantity values according to the difference.

DESCRIPTION OF THE DRAWINGS

A more thorough understanding of embodiments of the color calibration apparatus and color calibration method may be had from the consideration of the following detailed description taken in conjunction with the accompanying drawings in which:

Shown in FIG. 1 is an embodiment of an inkjet printer.

Figure 2:
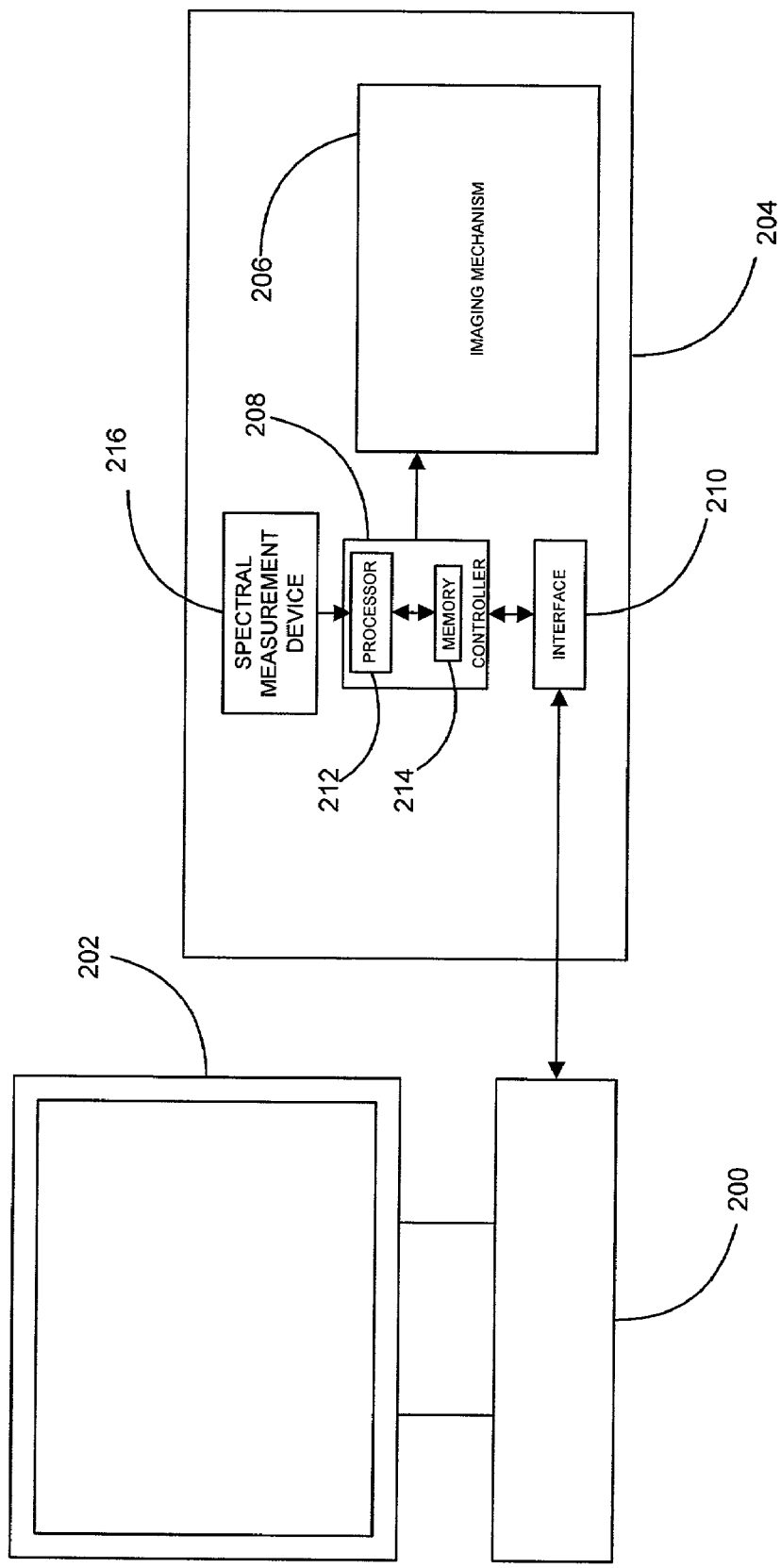

Shown in FIG. 2 is a high level block diagram of an embodiment of an imaging device.

Figure 3:
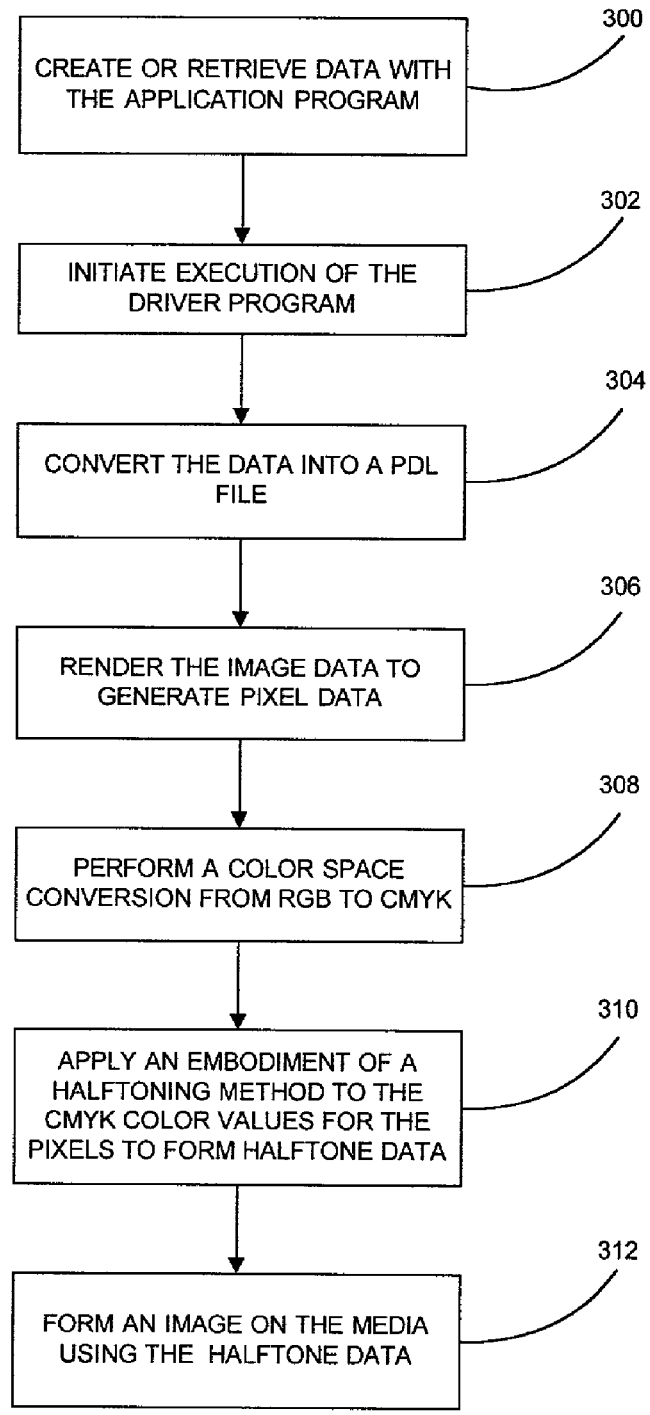

Shown in FIG. 3 is a high level flow chart of a method for forming images.

Figure 4:
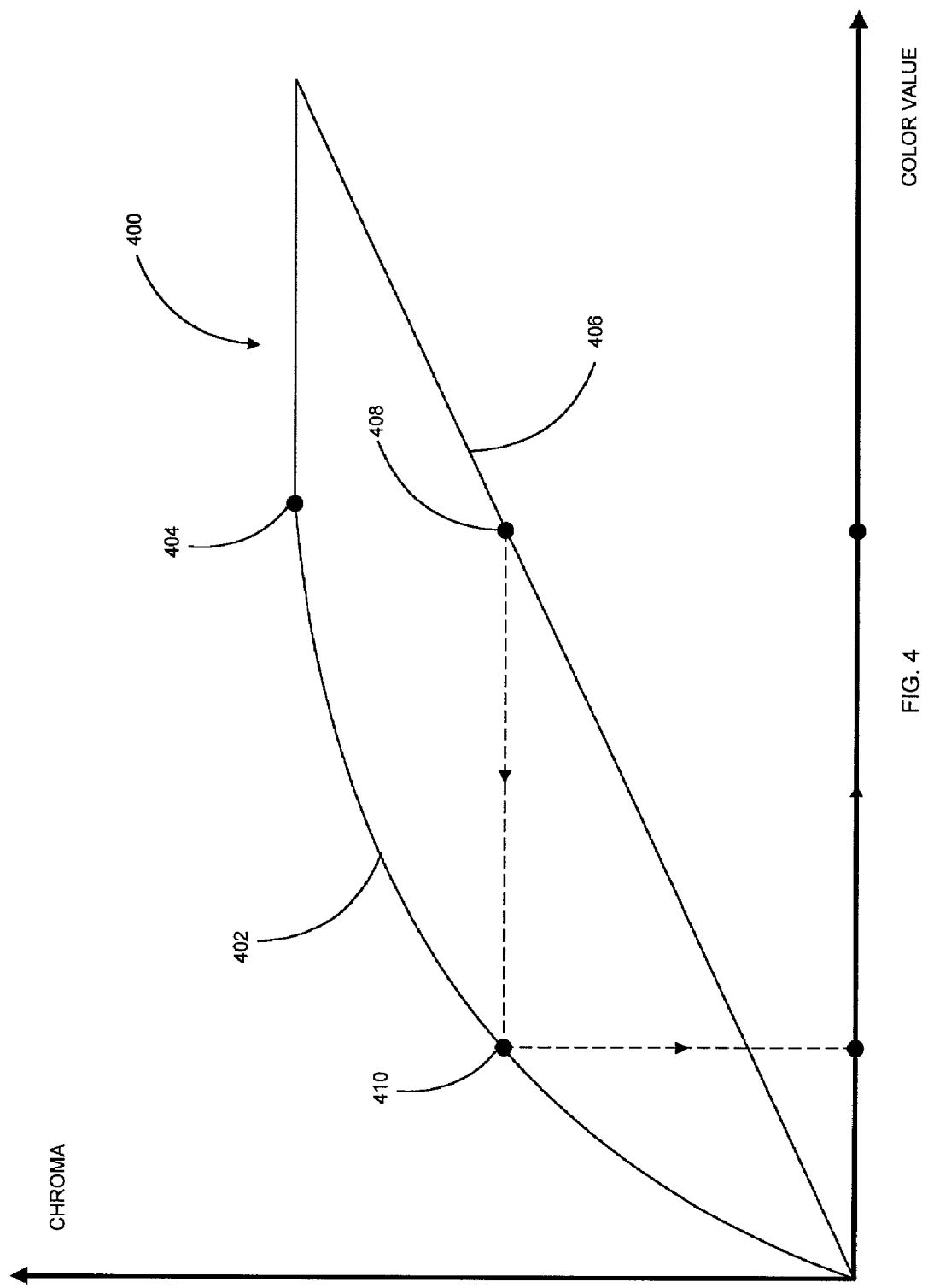

Shown in FIG. 4 are exemplary relationships between chroma values and color values illustrating how correction is done for non-linearities.

Figure 5A:
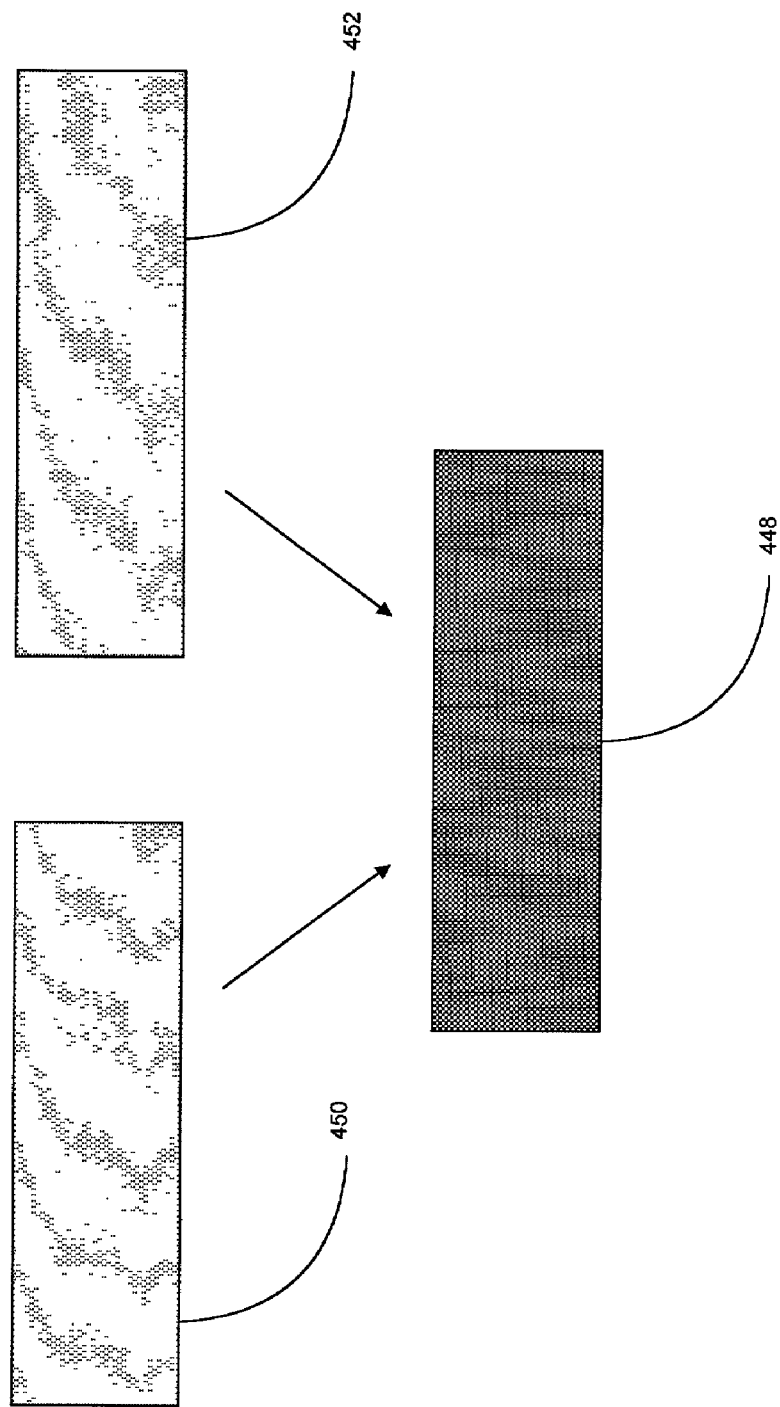

Shown in FIG. 5A is a region onto which colorants are placed that is used for determining a typical b* response.

Figure 5B:
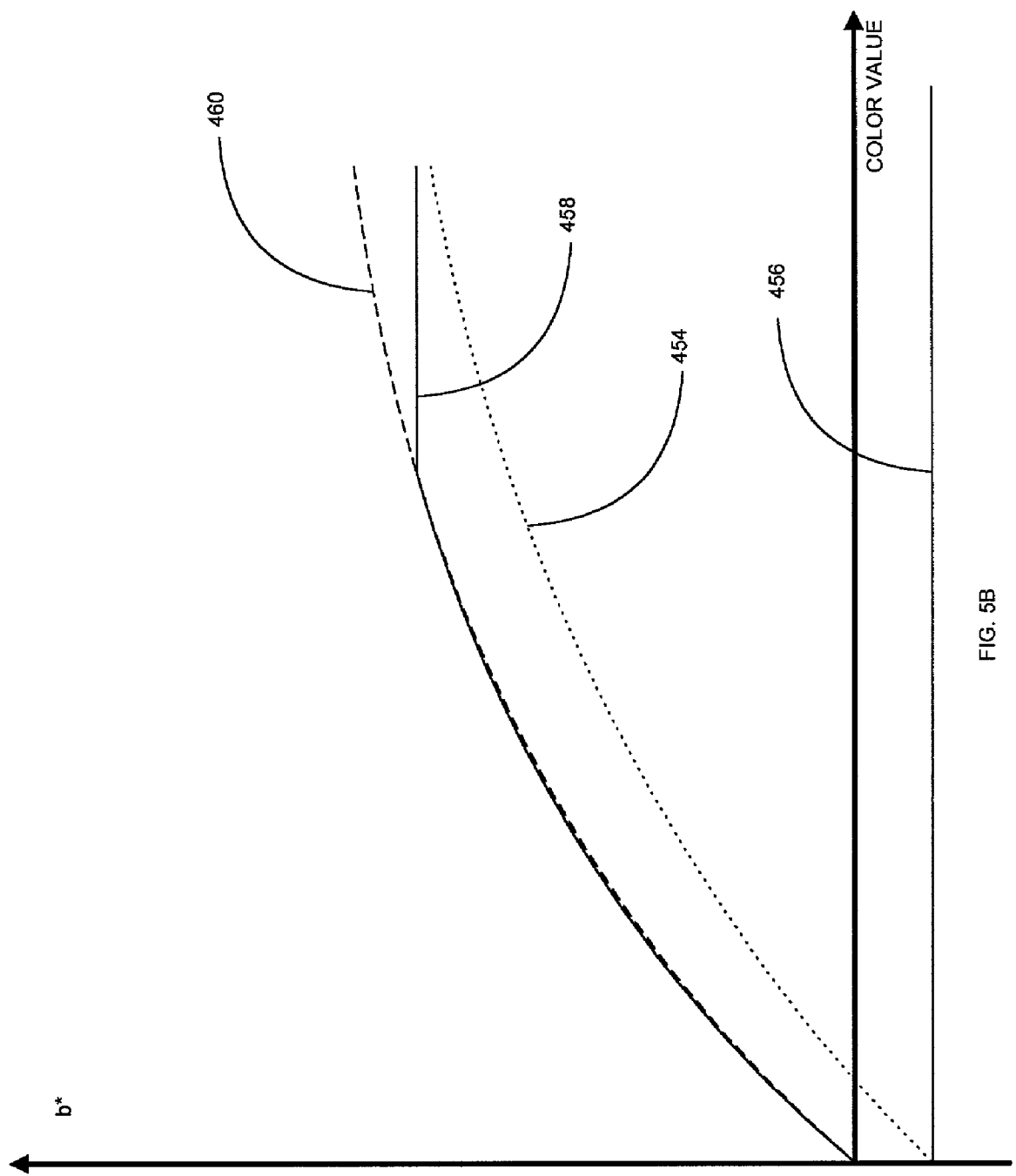

Shown in FIG. 5B is a relationship of measured b* values for the region shown in FIG. 5A.

Figure 6:
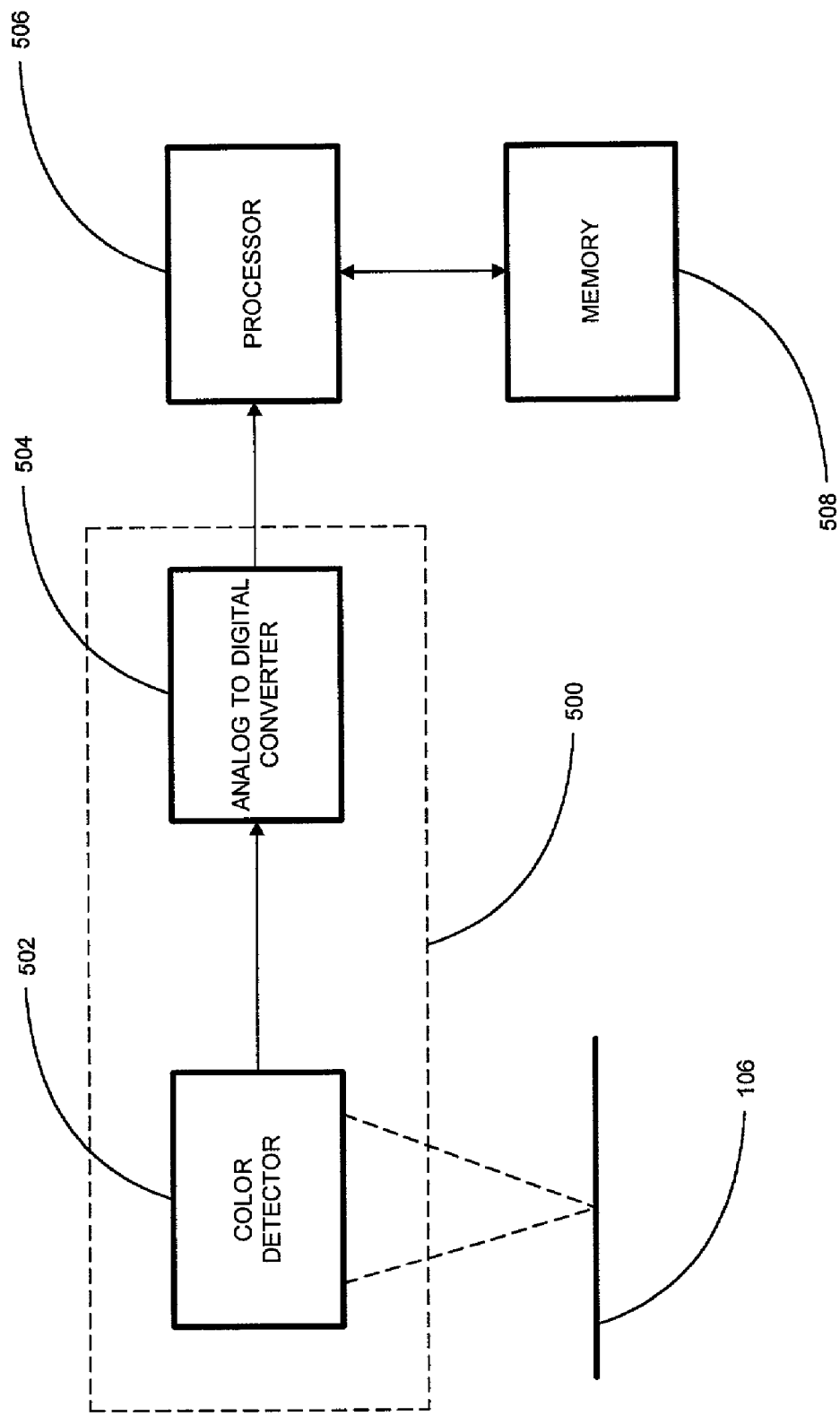

Shown in FIG. 6 is an embodiment of a system used in performing an embodiment of a color calibration method.

Figure 7:
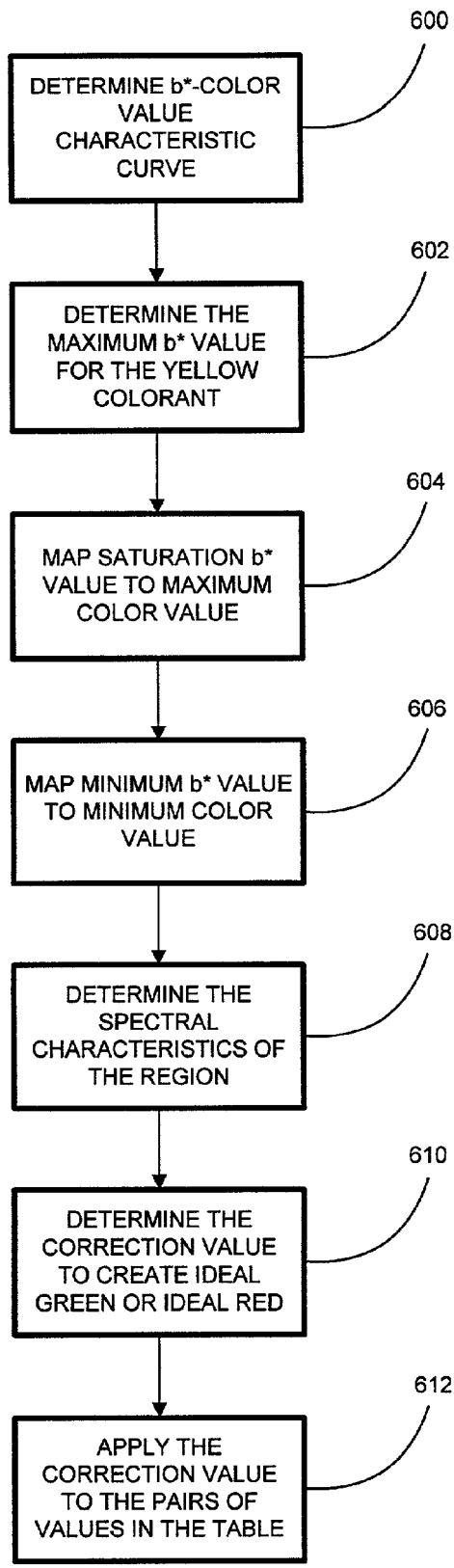

Shown in FIG. 7 is a high level flow diagram of an embodiment of a color calibration method.

Figure 8:
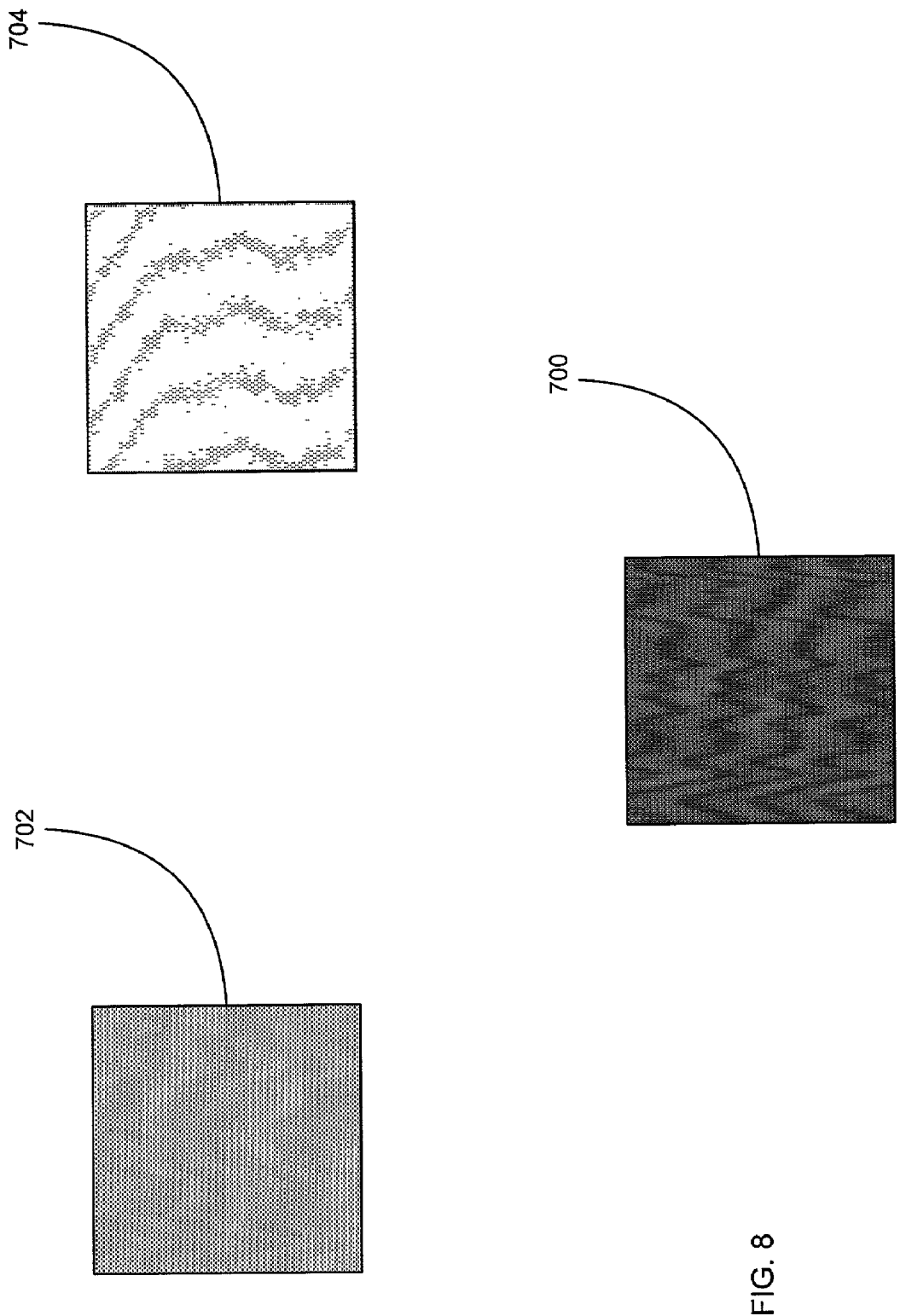

Shown in FIG. 8 are representations of regions formed on media used in performing an embodiment of the color calibration method.

Figure 9:
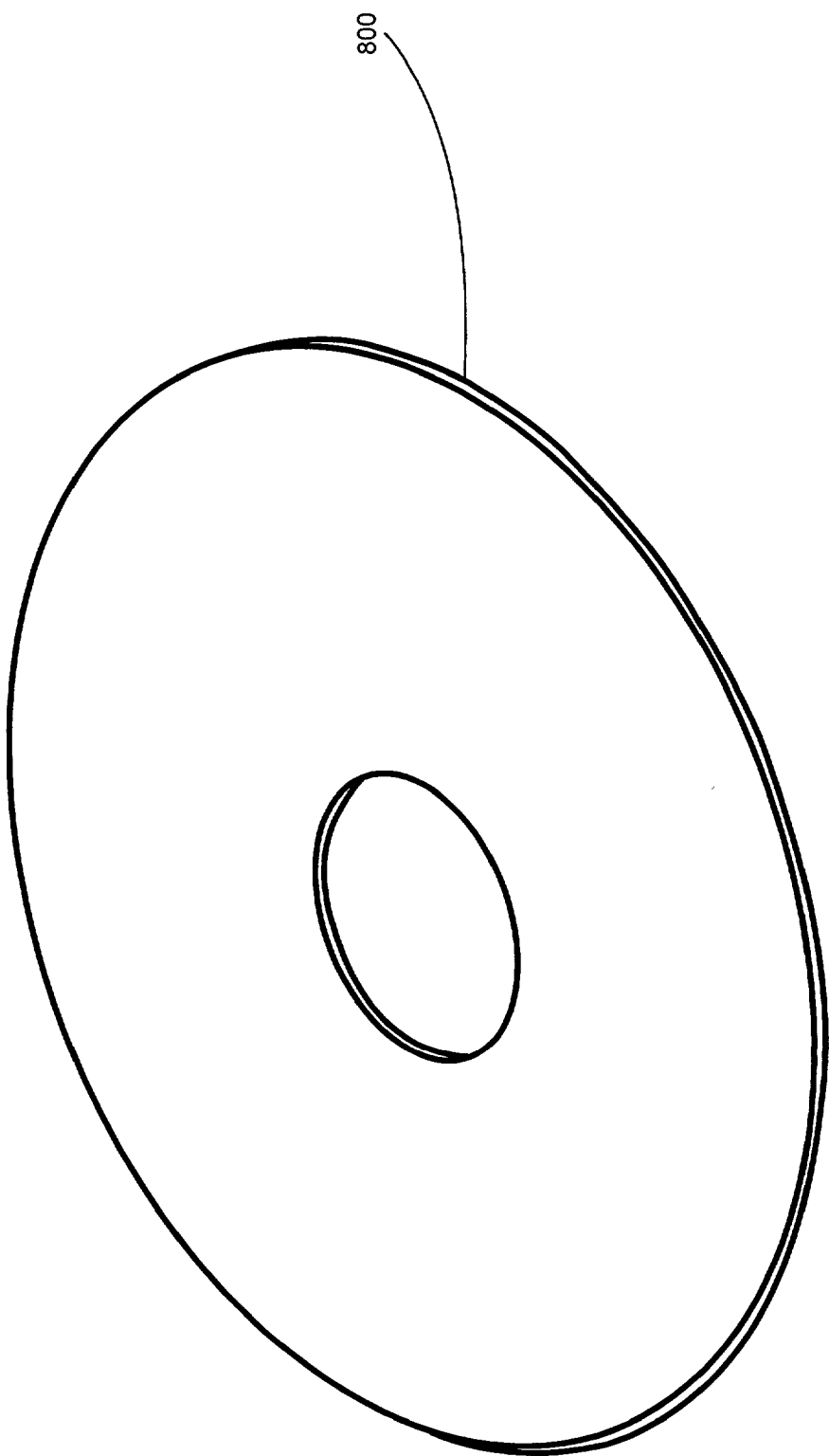

Shown in FIG. 9 is an embodiment of a storage device for storing an embodiment of the color calibration method.

DETAILED DESCRIPTION OF THE DRAWINGS

Although embodiments of the color calibration method will be discussed in the context of an inkjet printer, it should be recognized that embodiments of the color calibration method and color calibration apparatus could be usefully applied in other types of inkjet imaging devices such as inkjet facsimile machines or systems that reproduce photographs on media using ink as a colorant. Furthermore, embodiments of the color calibration method and color calibration apparatus could be usefully applied in electrophotographic imaging devices such as electrophotographic printers, electrophotographic copiers, or electrophotographic facsimile machines.

Figure 1:
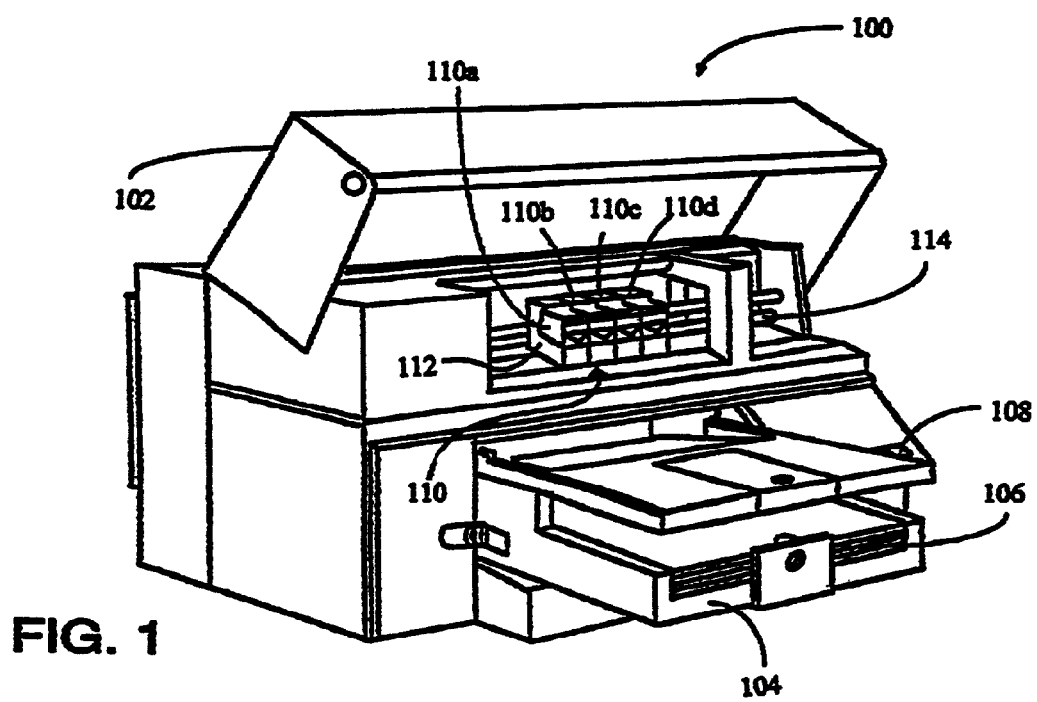

Shown in FIG. 1 is an embodiment of an imaging device, color inkjet printer 100, that includes processing circuitry forming an embodiment of the color calibration apparatus used in performing an embodiment of the color calibration method. Color inkjet printer 100 includes a cover 102, a media input tray 104 for holding media 106 to be used in an imaging operation, a media output tray 108 for receiving the units of media 106 on which images have been formed, color ink cartridges 110 (including a cyan cartridge 110a, a magenta (M) cartridge 110b, a yellow (Y) cartridge 110c, and a black (K) cartridge 110d), and a scanning carriage 112 for sliding along a slide bar 114 while colorant from one or more of color cartridges 110 is placed onto pixels. In color inkjet printer 100, the colorant stored in color cartridges 110 includes ink.

Shown in FIG. 2 is a block diagram representation of a system used for forming images on media 106. The system includes a computer 200. Computer 200 may execute an application program to generate data corresponding to an image displayed on monitor 202 (such as a CRT) or retrieve the data corresponding to the image from a storage device included within computer 200 through the application program. Typically, monitor 202 will display an image using an RGB color space and 24 bits (8 bits for each primary color) to specify the color value for each monitor pixel. An embodiment of an imaging device, printer 204 is coupled to computer 200. It should be recognized that although printer 204 is configured to perform the disclosed embodiments of the color calibration method, computer 200 and printer 204 could be configured so that substantial portions of an embodiment of the color calibration method are performed within computer 200. This would involve providing the results of color measurements made on colored regions formed onto media 106 to computer 200.

Printer 204 may include color inkjet printer 100 or other types of printers such as an electrophotographic printer. Printer 204 includes the capability to form color images upon media 106 using a set of colorants (such as ink or toner) forming a color space (e.g. cyan, magenta, and yellow and optionally black). Printer 204 may be configured to form images at 300 dpi, 600 dpi, 1200 dpi, or other resolutions. A printer driver program that can execute in computer 200 converts the data (corresponding to the image) received from the application program into a form useable by printer 204, such as a page description language (PDL) file. The PDL file may include for example a file defined in HEWLETT PACKARD'S PCL-3 or PCL-5 format.

Printer 204 renders the PDL file to generate pixel data including a color value for each pixel of each of the color planes forming the image. For example, an embodiment of printer 204 may generate color values for pixels forming the cyan, magenta, yellow, and black color planes. The color values for each of the pixels in the color planes may range, for example, from 0–255. A halftoning operation may be performed upon the color values of the color planes to generate halftone data for the image. The halftone data includes binary data specifying for each of the pixels in each of the color planes whether colorant for that color plane will be placed onto the pixel. Alternatively, the image may be formed using the color values for each of the pixels in each of the color planes without halftoning. For this alternative, the quantity of colorant placed onto the pixel is directly related to the color value for the pixel. For an inkjet printer, the quantity of the colorant is controlled by the number of drops of ink of a specific color placed onto the region of the media corresponding to the pixel. For an electrophotographic printer, the quantity of the colorant is controlled by the fractional portion of the region on the photoconductor corresponding to the pixel that is exposed and developed.

Included in printer 204 is an embodiment of an image forming mechanism, imaging mechanism 206. Imaging mechanism 206 includes the hardware necessary to place colorant on media 106. For example, in the case of an electrophotographic printer, imaging mechanism 206 may include a photoconductor, developing devices for developing cyan, magenta, yellow, and black toner (the colorants in this embodiment of imaging mechanism 206), a photoconductor exposure system for forming a latent electrostatic image on the photoconductor, a charging device for charging the photoconductor, a transfer device for transferring toner from the photoconductor to media 106, and a fixing device for fixing toner to media 106.

An embodiment of a controller, such as controller 208, coupled to imaging mechanism 206 controls the placement of colorant onto media 106 by imaging mechanism 206 making use of the halftone data or color values for the pixels forming each of the color planes. The output from the printer driver software executing in computer 200 is passed through interface 210 to controller 208. Controller 208 includes the capability to render the PDL file received from computer 200 to generate pixel data for each of the pixels forming the image. Controller 208 includes an embodiment of a processing device, such as processor 212 configured to execute firmware or software, or an application specific integrated circuit (ASIC) for controlling the placement of colorant onto media 106 by imaging mechanism 206. In addition, controller 208 includes an embodiment of a memory device, such as memory 214 for storing halftone data or color values for the pixels forming the image.

An embodiment of the color calibration apparatus is included within computer 200. Spectral measurement device 216 provides digital values corresponding to measurements of reflected light made on regions of media 106 onto which colorant has been placed. Using the digital values provided by spectral measurement device 216, processor 212 performs an embodiment of the color calibration method. Performing the embodiment of the color calibration method results in a set of values stored in memory 214 that correct for non-linearities in the chroma response of colorant placed onto media 106.

Further detail on embodiments of imaging mechanisms used in color electrophotographic imaging devices can be found in U.S. Pat. No. 5,291,251, entitled IMAGE DEVELOPMENT AND TRANSFER APPARATUS WHICH UTILIZED AN INTERMEDIATE TRANSFER FILM, issued to Storlie et. al., and assigned to Hewlett-Packard Company, and U.S. Pat. No. 5,314,774, entitled METHOD AND APPARATUS FOR DEVELOPING COLOR IMAGES USING DRY TONERS AND AN INTERMEDIATE TRANSFER MEMBER, issued to Camis, and assigned to Hewlett-Packard Company. Each of these two patents is incorporated by reference in their entirety into this specification.

In the case of a color inkjet printer, imaging mechanism 206 may include ink cartridges movably mounted on a carriage with its position precisely controlled by a belt driven by a stepper motor. An ink cartridge driver circuit coupled to the controller and the ink cartridges fires nozzles in the ink cartridges based upon signals received from the controller to place colorant on media 106 according to the halftone data or color values for the pixels forming each of the color planes. Further detail on embodiments of imaging mechanisms used in color inkjet printers can be found in U.S. Pat. No. 6,082,854, entitled MODULAR INK-JET HARD COPY APPARATUS AND METHODOLOGY, issued to Axtell et al., and assigned to Hewlett-Packard Company, and U.S. Pat. No. 5,399,039, entitled INK-JET PRINTER WITH PRECISE PRINT ZONE MEDIA CONTROL, issued to Giles et al., and assigned to Hewlett-Packard Company. Each of these two patents is incorporated by reference in their entirety into this specification.

Shown in FIG. 3 is a high level flow diagram of a method for forming an image on media using the system of FIG. 2. First, in step 300, a user creates data (or retrieves data) corresponding to an image on monitor 202 using the application program executing in computer 200. Next, in step 302, the user initiates execution of the printer driver program residing in computer 200 through the application program to begin the imaging operation. Then, in step 304, the driver program converts the data into a PDL file including image data useable by printer 204. The image data corresponds to the image on monitor 202 and is expressed in the RGB color space. Next, in step 306, the PDL file is rendered to generate pixel data for each pixel for the R, G, and B color planes. It should be recognized that the rendering operation may be performed in computer 200 or in printer 204. Then, in step 308, a color space conversion is performed to convert the color values for each pixel in the R, G, and B color planes into color values for each pixel in the C, M, Y, and K planes. It should be recognized that although the method for forming an image is discussed in the context of printer 204 making use of cyan, magenta, yellow, and black colorants to form images, embodiments of the color calibration method and color calibration apparatus could be usefully applied in imaging devices that use other types of colorants to form images. For example, embodiments of the color calibration method and color calibration apparatus could be used in inkjet imaging devices that make use of low dye load cyan colorant and low dye load magenta colorant. Or, embodiments of the color calibration method and color calibration apparatus could be used in imaging devices that make use of orange colorant and green colorant in addition to other colorants. Next, in step 310, an embodiment of a halftoning method is applied to the color values for the pixels in the C, M, Y, and K planes forming the image to generate halftone data. The halftone data indicates for every pixel in the image, in a binary fashion, whether each of the cyan, magenta, yellow, or black colorants are to be applied to the pixel. It should be recognized that the embodiment of the halftoning method could be performed within computer 200 or within controller 208. Finally, in step 312, the image is formed on media 106 by printer 204 using the halftone data. Instead of performing the embodiment of the halftone method in step 310, step 312 could involve formation of the image on media 106 by directly placing colorant onto pixels forming the image according to the color values associated with each pixel.

As previously mentioned, non-linearities generally exist for each of the primary colors used (for example, cyan, magenta, yellow) in the relationship between the color value for the primary and the corresponding chroma value that is produced. Shown in FIG. 4 is a graphical representation of a typical relationship between color values and chroma values. The horizontal axis is expressed in color value units that typically range from 0 through 255. The vertical axis is expressed in units of a chroma value. As can be seen from the right hand region 400 of curve 402, a color saturation effect occurs in which the incremental change in the chroma value for a fixed incremental change in the color value decreases or is substantially equal to zero as the color value increases. Point 404 represents a chroma value-color value pair substantially at the beginning of the saturation region. Where the colorant is yellow ink, the beginning of the saturation region is located substantially at the quantity of ink that results in dye crystallization (as will be subsequently described in greater detail). Curve 402 could be generated by ejecting a quantity of the primary color of ink corresponding to the color value or by transferring a quantity of the primary color of toner corresponding to the color value onto the media.

The quantity of ink is typically measured in terms of the number of drops ejected onto the media. The quantity of toner is typically measured in terms of developed mass per unit area onto discharged areas of the photoconductor (where a very high percentage of the toner developed onto the photoconductor is transferred to the media). Because the nominal mass of an ink drop is known, the mass of ink ejected onto the media for a color value can be determined. Likewise, because the distribution of the toner charge-mass ratio and the electrical characteristics of discharged areas on the photoconductor are known, the mass of toner developed onto a discharged region of a photoconductor can be determined.

Applying correction to the relationship represented by curve 402 has the effect of reshaping curve 402 so that it more closely follows a linear relationship between the chroma value and the color value. In the manufacturing process, tables are typically created for a nominal system that relates color values to values corresponding to quantities of colorant that are placed onto media for the nominal system. For an inkjet imaging device, the tables for the nominal system correspond to print cartridges that eject nominal ink drop quantities of the primary colors. In addition, there are tables that relate two corresponding sets of color values used for the purpose of correction for non-linearities. A set of these two sets of color values is included in the table relating color values to values of colorant quantities. The reshaping of curve 402 can be regarded as a re-mapping, at potentially each color value, of the color values in the table for each of the primary colors so that the quantities of the colorant necessary to produce the chroma values of curve 406, or something approximating it, results (curve 406 represents the corrected chroma value versus color value relationship). As an example, consider point 408 on curve 406. It is desired that providing the color value associated with point 408 will cause the placement of an amount of colorant onto the media so that the chroma value associated with point 410 results. Point 410 on curve 402 has the same chroma value as point 408, as can be seen from the horizontal dashed line connecting point 408 and point 410. To perform the re-mapping, the color value associated with point 408 is re-mapped, in the table for the corresponding primary color, with the color value associated with point 410. As a result, an input of the color value associated with point 408 is, through the re-mapping in the table, replaced by the color value associated with point 410. This re-mapping occurs over the range of chroma values present on curve 406. Because curve 402 may not be empirically formed using a set of values corresponding to each color value of curve 406, the re-mapping process may involve some interpolation between the chroma value-color value pairs that define curve 402. This re-mapping process substantially corrects for non-linearities in curve 402.

It should be recognized that one way to generate the tables for an inkjet imaging device would involve determining the table values for an ink cartridge that ejected nominal ink drop quantities. Subsequent correction operations would re-map the values in the table for specific non-nominal ink cartridges or for changes in ejected ink drop quantities over time. It should also be recognized that the correction for non-linearities in the chroma value-color value relationship for the nominal ink cartridge could be included in the color maps used to perform a color space conversion from a RGB color space to a CMYK color space. In this case, the corresponding entries in the table would have the same value. Subsequent correction operations would re-map the values in the table for specific non-nominal ink cartridges or for changes in ejected ink drop quantities over time.

Typically, the chroma value versus color value characteristic curve displays the previously mentioned color saturation effect. To accomplish the correction of curve 402, the chroma value occurring at the point on curve 402 at which saturation begins is selected as the chroma value to map to the maximum color value (typically 255). The minimum chroma value (typically zero along the a* axis and a slightly negative value on the b* axis because of the media color) is selected to map to the minimum color value (typically 0). The chroma values between the minimum chroma value and the chroma value mapped to the maximum color value are mapped to chroma values so that the resulting distribution of chroma value-color value pairs more closely approximates a line than the uncorrected chroma value-color value relationship. To accomplish this mapping, each of the integer color values is assigned to correspond to the ejection of the number of drops (or fractional exposure of pixels on the photoconductor) necessary to result in a chroma value that lies closer to the line that connects the minimum chroma value and the chroma value at the maximum color value. This mapping is used to generate a table that includes pairs of values specifying the number of drops of ink (or fractional exposure of pixels) that are to be ejected for each color value, for color values ranging from 0 to 255.

The correction process is directed at correcting for the non-linearities in the relationship between the chroma values and the color values. However, for darker primary colors, such as cyan and magenta, the characteristic curve which shows the color saturation effect is measured by measuring a luminance value (the L* value in the L*a*b* color space) as a function of the quantity of ink placed onto the media. For the darker primary colors the luminance value is measured because it is more easily measured than the corresponding chroma value and the relationship between the luminance value and the chroma value is known. Furthermore, the shape of the L* value as a function of the ink quantity is generally smooth, lacking in discontinuities that would make correcting for non-linearities more difficult. The correction that occurs for the luminance value-color value relationship for the darker primary colors adequately corrects for the non-linearities in the chroma value-color value relationship.

For a lighter primary color, such as yellow, the chroma value is directly measured and the chroma value-color value relationship is corrected based upon the measurement of chroma values. The correction based upon directly measured chroma values is done because of the measurement difficulties that would be associated with attempting to measure a luminance value as a substitute for a chroma value for lighter primary colors such as yellow. For the lighter primary colors, changes in chroma result in relatively small changes in the corresponding luminance value, making accurate measurement of the luminance signal difficult. In the L*a*b* color space, measurement of the yellow chroma value corresponds to measurement of the b* value. In the measurement of the b* value, the minimum value is typically −3 instead of 0 because the reflected light from some types of media contains a blue component.

Some types of inks have a tendency, when placed on media, to undergo a polymerization reaction that results in crystallization of molecules within the ink. Whether the crystallization will occur is influenced by the chemical nature of the ink, the type of the media, and the quantity of the ink deposited on the media. For yellow ink, the quantity of yellow ink at which crystallization occurs substantially corresponds to the maximum b* value that occurs for the yellow ink, which is substantially at the beginning of the saturation region. For quantities of yellow ink above the crystallization amount placed onto the media, a slight decrease in the b* value can occur. Therefore, the maximum chroma value achieved for yellow ink can be taken as the crystallization point. In the correction of the chroma value-color value curve for yellow ink, the maximum color value (typically 255) is mapped to the quantity of yellow ink needed to produce the claroma value measured at the crystallization point. Variability in the measurement of the b* value causes variability in determining the precise quantity of yellow ink that results in crystallization.

Toner does not generally undergo the polymerization reaction that occurs with ink. However, a saturation effect does occur with toner. Where the colorant includes yellow toner, the maximum color value (typically 255) is mapped to the quantity of yellow toner needed to produce the chroma value at the beginning of the saturation region shown in FIG. 4. It should be recognized that curve 402 is meant to show the shape of a typical relationship between the chroma value and the color value for ink or toner. There may be a substantial range of variability in the shape and magnitudes of actual chroma value-color value characteristic curves.

Performing correction on the chroma value-color value characteristic curve by mapping the maximum color value to the b* value occurring at the crystallization point allows for more efficient usage of yellow ink or yellow toner. Quantities of yellow ink beyond the crystallization point (which is at the threshold of the saturation region) are not applied to the media, thereby making efficient use of the yellow ink. The ink cartridges used to place ink onto media have variability in the quantity of ink included in each ejected ink drop. This variability exists between ink cartridges and within an ink cartridge as it is used. By performing the correction with respect to the measured crystallization point of the yellow ink instead of a predetermined target value for the b* value, accounting for variability between ink cartridges and variability within an ink cartridge over time can be done. Therefore, by performing calibrations on the imaging device, variability in the performance of the yellow ink cartridge can be corrected.

As previously mentioned, the chroma value-color value characteristic curve for the primary colors other than yellow is typically corrected in the luminance dimension of the color space as a substitute for direct correction of the chroma value, whereas correction of the chroma value-color value characteristic curve for yellow is done in the b* dimension of the color space. Consequently, when combinations of colorants of primary colors are made, the hue of the resulting color may be shifted from what would be expected based upon the color values of the primary colors. For example, consider a region formed of cyan colorant and yellow colorant, where the color value for cyan is 128 and the color value for yellow is 128. Ideally, the result of the combination of these colors of colorants would be green. However, because correction of the characteristic curve for the yellow colorant was performed in the b* dimension instead of the L* dimension, the actual amount of yellow colorant deposited may be too large or too small to generate the ideal green color. Therefore, correction for the non-linearities in the chroma value-color value characteristic of the yellow colorant is more effectively performed using combinations of colors instead of performing correction on the yellow colorant by itself.

Shown in FIG. 5A are representations of two monochromatic colored regions that are placed over each other to produce a colored region 448 having a hue gradient. Cyan region 450 is formed using a quantity of cyan colorant corresponding to a color value of 128. Yellow region 452 is formed using a variable quantity of yellow colorant (for an uncorrected yellow chroma value-color value relationship) corresponding to color values ranging from 0 on the left side to 255 on the right side. When the colored region 448 is formed by overlapping cyan region 450 and yellow region 452, the colored region 448 has a hue gradient ranging from cyan on the left side to a hue of green that is shifted toward the b* axis on the right side.

Shown in FIG. 5B is curve 454 showing a typical relationship between b* values that would be measured across colored region 448 formed by overlapping cyan region 450 and yellow region 452 and color values, curve 456 showing a typical relationship between b* values and color values across the cyan region 450, curve 458 showing a typical relationship between b* values and color values across the yellow region 452, and curve 460 showing an estimate of the yellow colorant contribution to curve 454. Curve 460 is derived from the difference between the b* values for curve 454 and the b* values for curve 456. Curve 460 illustrates that quantities of yellow colorant producing yellow chroma values beyond the beginning of the saturation region are useful for forming colors in combination with other colorants. The embodiments of the color calibration method and the color calibration apparatus disclosed in this specification make use of this characteristic to achieve improved accuracy in the reproduction of colors. By using measurements made of a value related to a hue of region formed using a combination of yellow colorant (including quantities of yellow colorant that would by themselves produce chroma values in the saturation region) and another colorant such as cyan colorant or magenta colorant to adjust the quantities of yellow colorant used for the range of input color values, the accuracy of color reproduction is improved.

An embodiment of a spectral measurement device having the capability to measure tristimulus values is used to measure a hue related value (such as a b* value) of the region formed from the deposition of the cyan colorant and the yellow colorant. Using this result, a correction is computed for the quantity of yellow colorant that will be deposited for a yellow color value of 128 (or a range of color values around 128). The computed correction is that which will yield a green color significantly closer to the ideal green color than what originally resulted for the yellow color value of 128. The ideal green color could be defined to correspond to a hue related value (such as a b* value) measured from a region formed by depositing substantially equal quantities of cyan colorant and yellow colorant corresponding to a color value of 128. Alternatively, the ideal green color could be defined to correspond to a hue related value measured by using an imaging device that deposited nominal quantities of cyan colorant and yellow colorant corresponding to a color value of 128. In an inkjet imaging device, this would correspond to using print cartridges that eject the nominal ink drop quantities.

A difference is determined between a hue related value (such as a b* value) and a predetermined hue related value (such as a predetermined b* value) that corresponds to the color that is intended to be formed (i.e. the ideal green). One way to use the difference is to change an association with at least one of a set of color values and corresponding colorant quantity values by computing arid applying a correction. One way to compute the correction is to form a fractional value from the difference divided by the predetermined hue related value. The computed correction to the yellow colorant quantity-color value mapping at the color value of 128 is applied to each pair of values In the table for all the color values ranging from 0 to 255. For example, if the computed correction indicates that the yellow colorant quantity at the color value of 128 should be reduced by a factor of 0.02, then the yellow colorant quantity (expressed either as the number of drops of ink or the fractional portion of pixels that will be exposed) at each color value in the table will be reduced by a factor of 0.02. The computed correction accounts for ink cartridges that eject non-nominal ink quantities. Another way to use the difference is to re-map pairs of color values (similar to what was previously explained in correcting for non-linearities for a primary color) to change the association between a set of color values and a corresponding set of colorant quantity values. One way to do the re-mapping is to compute the difference in the hue related values (such as a b* value) at the color value of 128 (or multiple color values) between the measured hue related value on a specific ink cartridge and the hue related value for a nominal ink cartridge and use this to perform a re-mapping of the color values in the table relating pairs of color values according to the difference. The re-mapping involves changing the table relating the two sets of color values so that the measured relationship between the hue related values (such as a b* value) and the color values for the overlapped cyan colorant and yellow colorant region approximates the relationship as it is for the nominal ink cartridge or the measured relationship of the hue related values and the color values equals the desired hue related value from combining equal quantities of cyan or magenta colorant at one or more specific color values (i.e. 32, 128, 224, etc.) This computed correction also accounts for ink cartridges that eject non-nominal ink quantities.

In the foregoing example, the results from measuring the tristimulus values for a single pair of cyan and yellow color values are used to generate a correction for the pairs of values over the entire range of color values from 0 to 255. However, it should be recognized that regions formed corresponding to multiple pairs of cyan and yellow color values could be used to generate corrections to the pairs of values forming the table. If this method is used, the correction to the pairs of values forming the table would be done using the correction value obtained for the measurements of the regions formed using the most closely located color values. For example, regions formed from cyan and yellow colorant using pairs of cyan and yellow color values separated by 16 (i.e. 16, 32, 48, 64, 80, etc) would be formed and then measured. From these measurements, a set of correction values corresponding to the color values used to form the regions are determined. Then these correction values are applied to values in the table including and between the color values used to form the regions. Alternatively, the correction values determined for the multiple regions could be averaged to determine a correction value to apply to the values in the table. The number of pairs of cyan and yellow color values that are used to generate regions used for determining correction values involves a tradeoff. The larger the number of pairs used, the more accurate the correction. However, the larger the number of pairs used, the greater the cost, measured in the time and expense involved in determining the correction values. Generating correction values for regions formed using pairs of cyan colorant and yellow colorant color values of 32 and 224 provides an acceptable balance between the accuracy of the correction and the cost of generating the correction values.

The resulting correction values are used to correct the corresponding yellow colorant quantity value-color value pairs in the table. In addition, for the color values in the table between the color values at which correction values were determined, an interpolation is performed to determine the corrected yellow colorant quantity values for the table. For the color values that lie outside of the range of color values at which correction values are determined (i.e., at a color value of 0 and 255) an extrapolation is performed to determine the corrected yellow colorant quantity values for the table. It should be recognized that although the generation of correction values for the yellow colorant quantity values in the table has been done using regions formed from cyan colorant and yellow colorant, correction values could also be generated using magenta colorant and yellow colorant. However, it has been determined for one implementation of the color calibration method that the generation of correction values using either cyan colorant and yellow colorant or magenta colorant and yellow colorant provides sufficient correction for the color gamut that can be produced by the imaging device.

Shown in FIG. 6 is a schematic representation of a system included within inkjet printer 204 for measuring tristimulus values on regions of media 106 onto which ink has been placed. It should be recognized that this system could be adapted for use within a color electrophotographic printer for measuring tristimulus values for regions on which toner has been placed. An embodiment of a spectral measurement device, spectral measurement device 500, includes a configuration to generate values related to the color of the regions onto which ink has been placed on media 106. Color detector 502, included within spectral measurement device 500, includes four LEDs. A first LED can emit red light, a second LED can emit orange light, a third LED can emit green light, and a fourth LED can emit blue light. An optical sensor, included within color detector 502, has the capability to measure the intensity of reflected light over a range of the visible spectrum is positioned to receive light generated by each of the LEDs that has been reflected from media 106. The LEDs are sequentially illuminated. Color detector 502 provides an analog output from the optical sensor corresponding to the intensity of the light reflected from media 106. Analog to digital converter 504, included within spectral measurement device 500, is coupled to the output of the optical sensor included within color detector 502. A processing device, such as processor 506, is coupled to analog to digital converter 504. Processor 506 configures analog to digital converter 504 for performing the analog to digital conversion of the four analog values provided by the optical sensor corresponding to the reflected light from each of the four LEDs. Memory 508 is used to store the code executed by processor 506 to perform an embodiment of the color calibration method, yellow correction values, and the tables of pairs of yellow colorant quantity values-color values.

Four digital values are generated from the four analog measurements received from color detector 502. Using the four digital values, processor 506 executes code to generate the XYZ tristimulus values for the color of the region that was measured. The code executed by processor 506 performs a curve fitting function developed during calibration of color detector 502 that compensates for inaccuracies in color detector 502 over the color space gamut. More information on the generation of the calibration curve for color detector 502 can be found in the co-pending application having attorney's docket number 10019535-1, the disclosure of which is incorporated by reference in its entirety into this specification. Using the XYZ tristimulus values, processor 506 executes code to perform a color space conversion to generate the L*, a*, and b* values corresponding to the XYZ tristimulus values.

Shown in FIG. 7 is a high level flow chart of an embodiment of a method for determining and applying the yellow correction values for more accurate reproduction of colors. First, in step 600, the b* value versus the color value characteristic curve is formed for the yellow colorant (either ink or toner) by forming regions of colorant on media corresponding to each of the color values from 0 through 255 using an embodiment of an imaging device. Next, in step 602, the maximum b* value for the yellow colorant is determined using the system shown in FIG. 4. Then, in step 604, processor 506 executes code to map the quantity of colorant necessary to produce the b* value at the beginning of the saturation region (typically close to the maximum b* value) is mapped to the maximum color value (typically 255). Next, in step 606, processor 506 executes code to map the quantity of the colorant corresponding to the minimum b* value to the minimum color value (typically 0). Then, in step 606, processor 506 executes code to adjust the colorant quantity values (stored in memory 508) for each color value between 0 and 255 so that the resulting b* values lie closer to the line defined by the b* value at a color value of 0 and the b* value at a color value of 255.

Next, in step 608, the spectral characteristics (the L*a*b* values determined as previously mentioned) of the region formed using the cyan colorant and the yellow colorant are determined using the system shown in FIG. 4. Alternatively, the regions could be formed of magenta colorant and yellow colorant. Then, in step 610, processor 506 executes code to determine the correction value necessary to create the desired color (either an ideal green or ideal red) at the color values used to form the region. Next, in step 612, processor 506 applies those correction values to the table containing the pairs of yellow colorant quantity values-color values or performs a re-mapping of the pairs of color values.

The yellow correction values specify the change in the quantity of yellow colorant necessary to correct for the hue shift of the region away from either the ideal green color or the ideal red color. The correction values could be determined computationally or they could be determined using a lookup table. Memory 508, coupled to processor 506, stores the lookup table containing the correction values. The lookup table contains values representing the fractional change (e.g. −0.02 or 0.01) in colorant quantity needed to create the regions so that they have the ideal green color or the ideal red color. The values in the lookup table are typically empirically developed for an ink-media system or a toner-media system. Measurements are made of a range of combinations of quantities of yellow colorant and either cyan colorant or magenta colorant. From these measurements the incremental change in the quantity of yellow colorant needed to change a hue of a region from its present value to either an ideal green or ideal red is determined. These values are stored in the lookup table. The incremental quantity of yellow colorant needed may be either a positive value or a negative value. The values resulting from the determination, by processor 506, of the hue shift of the regions from the ideal color are used as an index to access the lookup table values stored in memory 508 that correspond to the correction values.

Memory 508 also stores the table developed during the correction for the non-linearities in the b* value-color value characteristic curve. In step 614, after accessing the correction values, processor 506 applies the correction values to the table stored in memory 508. If a single set of cyan color values and yellow color values (or magenta color values and yellow color values) was used to determine the correction values, the application of the correction values to the table would include multiplying each of the yellow colorant quantity values in the table by the fractional change value subtracted from one.

If multiple sets of cyan color values and yellow color values were used to determine a set of correction values, applying the set of correction values to the table includes performing interpolation and extrapolation operations. Consider the case in which correction values are generated for two color values, one at 32 and one at 224. The correction value for 32 is subtracted from one and multiplied by the yellow colorant quantity value in the table for a color value of 32 to yield a corrected a corrected yellow colorant quantity value. Likewise, the correction value at 224 is subtracted from one and multiplied by the yellow colorant quantity value in the table for a color value of 224 to yield a corrected yellow colorant quantity value. These two sets of points (yellow colorant quantity value and color value) define a line. Using these points, processor 506 determines the parameters necessary to define the line (slope and intercept). Then, for each color value from 0 to 255, processor 506 adjusts the corresponding yellow colorant quantity value so that it lies closer to the defined line.

Shown in FIG. 8 are regions representative of the type that are formed for performing embodiments of the color calibration method and apparatus. Region 700 corresponds to a region formed using cyan colorant and yellow colorant in quantities corresponding to a color value 224. Region 702 corresponds to a region formed using cyan colorant and yellow colorant in quantities corresponding to a color value of 32. Region 704 corresponds to a region formed using cyan colorant and yellow colorant in quantities corresponding to a color value of 128. As previously mentioned, region 700, region 702, and region 704 could, alternatively, be formed using cyan colorant and magenta colorant. Region 700, region 702, and region 704 could be formed using a binary halftone process or a multi-bit halftone process. For the use of a binary halftone to form the regions, the pixels included in the region would have either yellow colorant or cyan colorant deposited onto the pixel in the maximum quantity of colorant that can be deposited onto a pixel in an attempt to form the desired color. For the use of a multi-bit halftone to form the regions, variable quantities of either colorant used could be placed on each of the pixels in an attempt to form the desired color.

Shown in FIG. 9 is an embodiment of a storage device, including an embodiment of a computer readable medium, such as a compact disk 800, on which code for an embodiment of the color calibration method could be stored. Embodiments of the color calibration method could be stored on other embodiments of computer readable mediums, such as hard disks, digital tapes, floppy disks, and the like. Embodiments of the color calibration method could be distributed to users on the compact disks or floppy disks for installation onto the hard disk drive in a computer. Alternatively, embodiments of the compression method could be distributed through a network to a computer or to a network enabled imaging device.

Although an embodiment of the color calibration method and apparatus has been illustrated, and described, it is readily apparent to those of ordinary skill in the art that various modifications may be made to this embodiment without departing from the scope of the appended claims.

What is claimed is:

1. A method, comprising:
   depositing a first quantity of a first colorant corresponding to a first color value included in a first plurality of color values and a second quantity of a second colorant corresponding to a second color value on a region of media, with individual of the first plurality of color values corresponding to individual of a second plurality of color values that correspond to individual of a plurality of first colorant quantity values;
   determining a value related to a hue of the region;
   determining a difference between the value related to the hue of the region and a predetermined value; and
   changing at least one of the second plurality of color values according to the difference.

2. The method as recited in claim 1, wherein:
   each of a second plurality of color values corresponds to a one of a plurality of first colorant quantity values including a first colorant quantity value corresponding to the first quantity of the first colorant.

3. The method as recited in claim 2, wherein:
   the value related to the hue corresponds to a b* value in a L*a*b* color space;

the predetermined value corresponds to a predetermined b* value in a L*a*b* color space related to a hue intended to result from depositing the first quantity of the first colorant and the second quantity of the second colorant on the region of the media.

4. The method as recited in claim 3, wherein:
the first plurality of color values range from 0 through 255.

5. The method as recited in claim 4, wherein:
determining the value of the region includes illuminating the region successively with a plurality of colors of light;
performing a measurement of reflected light from the region for each of the plurality of colors to generate a plurality of measurements; and
combining the plurality of measurements to determine the value of the region.

6. The method as recited in claim 5, wherein:
the first color value consists of an integer selected from a range of 112 through 128.

7. The method as recited in claim 6, wherein:
the first colorant includes yellow colorant; and
the second colorant includes cyan colorant.

8. The method as recited in claim 7, wherein:
the yellow colorant includes yellow ink; and
the cyan colorant includes cyan ink.

9. A method, comprising:
depositing a first quantity of a first colorant, corresponding to a first color value, and a second quantity of a second colorant corresponding to a second color value on a region of media, with the first color value included in a plurality of color values;
determining a value related to a hue of the region;
determining a difference between the value related to the hue of the region and a predetermined value; and
changing one of a plurality of first colorant quantity values, corresponding to the first quantity of the first colorant and with the plurality of first colorant quantity values corresponding to the plurality of color values by dividing the difference by the predetermined value to form a fraction, multiplying the fraction by the one of the plurality of first colorant quantity values to form a result and adding the result to the one of the plurality of first colorant quantity values.

10. The method as recited in claim 9, wherein:
the value related to the hue corresponds to a b* value in a L*a*b* color space; and
the predetermined value corresponds to a predetermined b* value in a L*a*b* color space related to a hue intended to result from depositing the first quantity of the first colorant and the second quantity of the second colorant on the region of the media.

11. The method as recited in claim 10, wherein:
determining the value related to the hue of the region includes illuminating the region successively with a plurality of colors of light;
performing a measurement of reflected light from the region for each of the plurality of colors to generate a plurality of measurements; and
combining the plurality of measurements to determine the value related to the hue of the region.

12. The method as recited in claim 11, wherein:
the plurality of color values range from 0 through 255.

13. The method as recited in claim 12, wherein:
the first color value consists of an integer selected from a range of 112 through 128.

14. The method as recited in claim 13, wherein:
the first colorant includes yellow colorant; and
the second colorant includes cyan colorant.

15. The method as recited in claim 14, wherein:
the yellow colorant includes yellow ink; and
the cyan colorant includes cyan ink.

16. An apparatus, comprising:
a spectral measurement device configured to generate output corresponding to a spectral content of light reflected from a region on media formed by depositing a first quantity of a first colorant and a second quantity of a second colorant onto the media;
a memory to store a first plurality of color values, a corresponding second plurality of color values, and a plurality of first colorant quantity values corresponding to the second plurality of color values; and
a processing device coupled to the memory and arranged to receive the output from the spectral measurement device and configured to determine a value related to a hue of the region using the output, configured to determine a difference between the value related to the hue of the region and a predetermined value, and configured to change at least one of the second plurality of color values according to the difference.

17. The apparatus as recited in claim 16, wherein:
the processing device includes a configuration to change the association between the plurality of color values and the plurality of first colorant quantity values by chancing the at least one of the second plurality of color values according to the difference to change.

18. The apparatus as recited in claim 17, wherein:
the value corresponds to a b* value in a L*a*b* color space; and
the predetermined value corresponds to a predetermined b* value in a L*a*b* color space related to a hue intended to result from depositing the first colorant and the second colorant on the region of the media.

19. The apparatus as recited in claim 18, wherein:
the spectral measurement device includes a configuration to illuminate the region successively with a plurality of colors of the light and perform a plurality of measurements of the light reflected from the region to generate the output; and
the processing device includes a configuration to determine the value related to the hue using the plurality of measurements.

20. The apparatus as recited in claim 16, further comprising:
an interface arranged to receive data from a computer; and
an imaging mechanism configured to form an image on media corresponding to image data and configured to deposit the first quantity of the first colorant and deposit the second quantity of the second colorant; and.

21. The imaging device as recited in claim 20, wherein:
the value corresponds to a b* value in a L*a*b* color space; and
the predetermined value corresponds to a predetermined b* value in a L*a*b* color space related to a hue intended to result from depositing the first colorant and the second colorant on the region of the media.

22. The imaging device as recited in claim 21, wherein
the first colorant includes yellow colorant; and
the second colorant includes cyan colorant.

23. An apparatus, comprising:
a spectral measurement device configured to generate output corresponding to a spectral content of light reflected from a region on media formed by depositing a first quantity of a first colorant and a second quantity of a second colorant onto the media;

a memory to store a first plurality of color values, a corresponding second plurality of color values, and a plurality of first colorant quantity values corresponding to the second plurality of color values; and a processing device coupled to the memory and arranged to receive the output from the spectral measurement device and configured to determine a value related to a hue of the region using the output, configured to determine a difference between the value related to the hue of the region and a predetermined value with the processing device including a configuration to change each one of the plurality of first colorant quantity values by dividing the difference by the value related to the hue to form a fraction, multiplying the fraction by the one of the plurality of first colorant quantity values to form a result and adding the result to the one of the plurality of first colorant quantity values to change the association between the plurality of color values and the plurality of first colorant quantity values.

24. The apparatus as recited in claim 23, further comprising:

an interface arranged to receive data from a computer; and an imaging mechanism configured to form an image on media corresponding to image data and configured to deposit the first quantity of the first colorant and deposit the second quantity of the second colorant.

25. A calibration system, comprising:

means for measuring tristimulus values of an area of media having deposited a first quantity of a first colorant corresponding to a first color value and having deposited a second quantity of a second colorant corresponding to a second color value;

means for determining a first set of values representing a color of the area using the tristimulus values;

means for determining a difference between the first set of values and a second set of values related to a hue intended to result from the first colorant and the second colorant;

a memory to store a third set of values each of which represent a quantity of the first colorant, including the first quantity of the first colorant and correspond to one of a fourth set of color values including the first color value; and means for changing an association between the third set of values and the fourth set of values by changing a fifth set of values, corresponding to the third set of values and corresponding to the fourth set of values, according to the difference.

26. The calibration system as recited in claim 25, wherein:

means for determining the first set of values determines L*a*b* values from the tristimulus values; and the fourth set of values includes integers ranging from 0 to 255.

27. A storage device, comprising:

a computer readable medium;

processor executable instructions stored on the computer readable medium and configured to determine a value related to a hue of a region of media having deposited onto the media a first quantity of a first colorant corresponding to a first color value included in a first plurality of color values and a second quantity of a second colorant corresponding to a second color value using a first set of values related to a spectrum of light reflected from the region, with individual of the first plurality of color values corresponding to individual of a second plurality of color values that correspond to individual of a plurality of first colorant quantity values, and with the processor executable instructions configured to determine a difference between the value related to the hue and a predetermined value, and configured to change at least one of the second plurality of color values according to the difference.

28. The storage device as recited in claim 27, wherein:

the value corresponds to a b* value in a L*a*b* color space;

the predetermined value corresponds to a predetermined b* value in a L*a*b* color space of a hue intended to result from depositing the first colorant and the second colorant on the region of the media.

29. The storage device as recited in claim 28, wherein:

the first colorant includes yellow colorant; and the second colorant includes cyan colorant.

* * * * *